Nov. 6, 1951 C. H. JUDD 2,574,330
FASTENING DEVICE
Filed Aug. 12, 1947
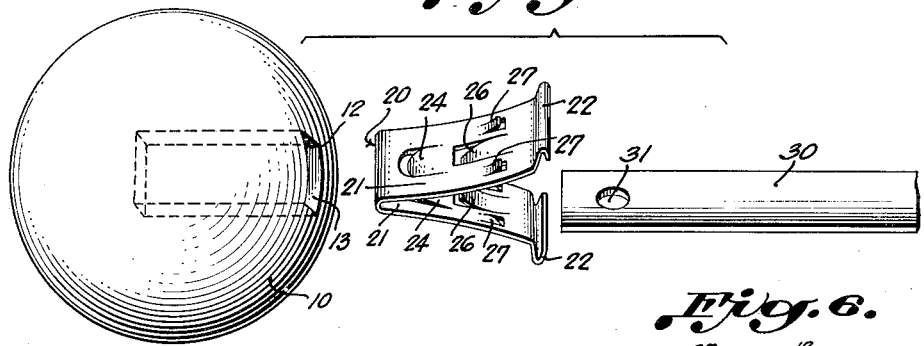
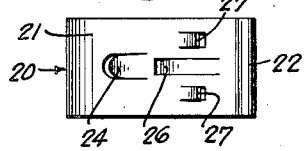
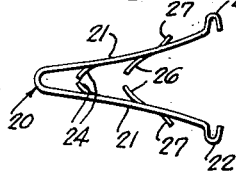
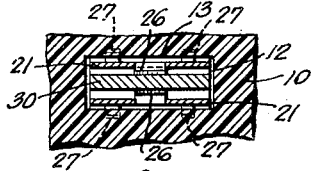
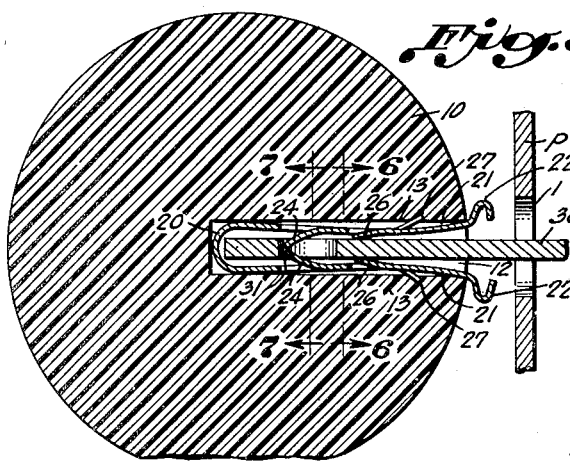
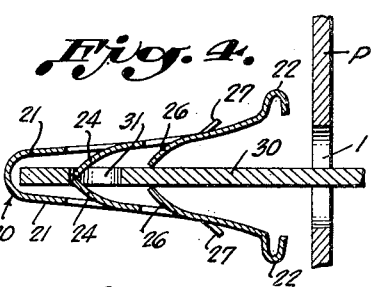
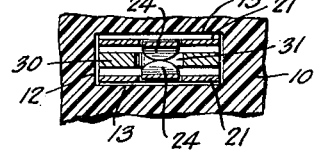
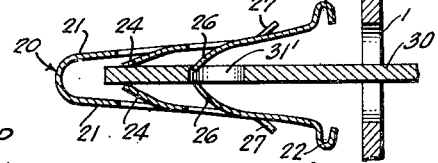
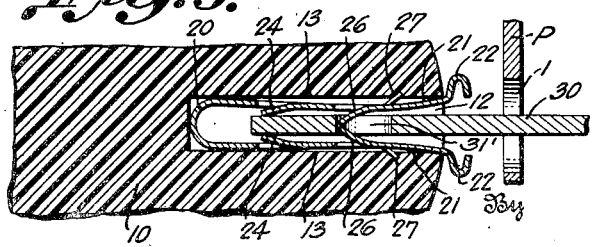
Inventor
CHARLES H. JUDD
H. G. Lombard
Attorney Patented Nov. 6, 1951

2,574,330

UNITED STATES PATENT OFFICE 2,574,330

FASTENING DEVICE

Charles H. Judd, Cleveland, Ohio, assignor to Tinnerman Products, Inc., Cleveland, Ohio, a corporation of Ohio Application August 12, 1947, Serial No. 768,202

7 Claims. (Cl. 287—53)

This invention relates to improved connections for securing a knob, handle or other object to a shaft, rod, spindle or similar operating member in fixedly held position against relative axial movement as well as relative rotative movement for use in effecting axial thrust-like operations or for the purpose of transmitting or receiving a relatively small torque without resulting in objectionable looseness, wobble, and side play in the connection.

More particularly, the invention is directed to improved connections for detachably securing an operating member or other article of manufacture to a shaft or rod employed, for example, as the operating member for an adjustable control unit. It is often necessary or desirable that such a rod or shaft includes a flat shank or stem at one end thereof which may be releasably secured to a cooperating part or object, such as a plastic knob or handle.

It has been the common practice to provide a socket opening in a plastic part and fit an end of the shaft into such socket opening together with anchoring means for retaining the knob and shaft stem against relative movement; and to this end, various anchoring or retaining means such as set screws, clutch devices and the like, have been employed which exert a binding or wedging action between the shaft and inner side walls of the socket opening. The plastic part usually is relatively fragile and brittle and when thus provided with a socket opening receiving the shaft together with anchoring means exerting a more or less localized binding or wedging action between the shaft and the adjacent inner wall of the socket opening, there frequently occurs a splitting or fracture of the plastic part in the application of the shaft stem thereto or incidental to strain taking place after a period of use with the result that even though the knob is not completely broken, it is so loosely fitted to the shaft that it is practically useless and must be replaced anyway.

A primary object of the present invention, therefore, is to provide an improved form of connection which overcomes the foregoing insufficiencies of the prior art devices in the use of a spring holding clip device which is so designed as to serve as a resilient bushing or bearing for supporting and securing a knob, handle or other article of manufacture directly to a shaft, or the like, against relative axial as well as relative rotative movement.

A further object of the invention is to provide such a connection in which the connected end of the shaft or rod is in the form of a flat shank or stem.

Another object of the invention is to provide a connection such as described in which the flat shank or stem is secured to the knob or other object by a clip having a positive locked connection with the shaft.

An additional object of the invention is to provide a connection of this character in which the flat shank or stem is adapted to be secured to the knob or other object in different axial positions for adjustment purposes of for use in different installations.

A further object of the invention is to provide a connection which embodies all the foregoing features of construction together with means for effecting a quick and ready release and separation of the parts of the connection.

Further objects and advantages of the invention, and other new and useful features in the construction, arrangement, and general combination of parts, will be readily apparent as the following description proceeds with reference to the accompanying drawings, for purposes of illustration but not of limitation, in which like reference characters designate like parts throughout, and in which:

Fig. 1 is an exploded perspective view showing the several parts of a connection in accordance with the invention in the relative position thereof for completing the connection;

Fig. 2 is a front elevational view of the spring clip included in Fig. 1,

Fig. 3 is an edge elevational view of the spring clip shown in Fig. 2;

Fig. 4 is a vertical sectional view showing the fastener of Figs. 2 and 3 as applied to the projecting end of a flat shank or stem on a shaft extending through an opening in the panel, or the like;

Fig. 5 is a similar sectional view showing the knob or other object as applied to connected relation with the projecting end of the shaft and the clip attached thereon;

Fig. 6 is a sectional view of Fig. 5 taken along line 6—6, looking in the direction of the arrows; and, Fig. 7 is a sectional view of Fig. 5 taken along line 7—7, looking in the direction of the arrows.

Fig. 8 is a sectional view similar to Fig. 4 showing the spring clip applied to the end of the flat shank or stem of the shaft as disposed in a different projecting relation to the panel member, and Fig. 9 is a fragmentary sectional view, similar to Fig. 5, showing the knob or other object connected to the projecting end of the shaft in the relation shown in Fig. 8.

The connecting means of the present invention is one of general utility and the primary object contemplates the provision of a simple, inexpensive fastening construction which may be readily embodied in practically any installation wherein a knob, handle or other object is detachably connected to a shaft, rod, spindle or the like, particularly one having a flat shank or stem on the free end thereof.

In general, the invention involves an arrangement whereby a relatively large knob, handle or other part may be provided at very low cost with an improved connecting means for securing the same to a shaft, rod or stem of considerably smaller cross-section by means of a spring anchoring clip designed to engage in a simple recess provided in such part and including resilient bearing surfaces defining a resilient bushing for embracing the shaft and providing a positive connection therewith. Moreover, the knob, handle or other part to be secured or mounted need be provided only in the manner of a conventional solid or hollow, one piece plastic device having a simple form of recess in the form of a slot or the like which, of course, greatly facilitates the quantity production of a high grade article at minimum cost inasmuch as only the simplest molding equipment is required.

Additionally, the instant connecting means requires only the use of a simple, inexpensive, spring holding clip which is concealed from view in a completed installation and otherwise eliminates expensive and time consuming drilling, tapping and broaching operations heretofore necessary in producing similar articles, in addition to dispensing with the use of set screws and special forms of clutch devices for exerting a binding or wedging action on the shaft. The improved construction of the present invention involves a decided advantage over heretofore known devices in that the spring holding clip is designed to provide a bearing in the part to be secured and otherwise present a resilient bushing in the socket opening which is associated with the shank or stem of the shaft in such manner as to absorb substantially the entire thrust and strain taking place in turning movements and other operations. Thus there is no localized pressure on any portion of the walls of the recess in the plastic knob or other article of manufacture as would cause a splitting or breaking thereof either at the time of the initial attachment or after a period of use in an installation.

The invention is disclosed with reference to knob or handle members such as may be employed as panel knobs on radio sets, control or lever members and similar devices on automobile and aeroplane instrument panels, or the valve handles on stove burner units and the like; it is to be understood, however, that the improved connecting means is not limited to the types of devices herein illustrated and described since it is quite obvious that the invention is equally adaptable to use as the means for securing, mounting or connecting various other articles of manufacture to shafts, posts, rods, spindles, and the like.

In the drawings, there is shown by way of illustration, an application of the improved connecting means as employed for mounting a knob or handle onto a control shaft or lever which is used for operating an aeroplane instrument or mechanism, for example. The knob or any other object designated generally 10, is formed of any suitable material, preferably a plastic composition molded into a compact device of any selected size or shape. In the present example, the knob is in the form of a substantial ball-shape which may be either solid of hollow together with a suitable socket opening 12 having a contour corresponding generally to the cross-section of the shank or stem on a shaft, rod, or other operating member. Inasmuch as the shank or stem 30 is flat, the socket opening in the knob, handle or other object is provided by a complementary slot-like recess 12 having side walls 13 spaced slightly larger than the cross-section of the flat shank or stem on the shaft or other operating member.

The spring holding clip device 20 is of such design as to be received within said recess 12 and includes means adapted for anchoring engagement with the side walls 13 of said recess under continuous spring tension. The spring clip 20 is constructed of any suitable sheet metal, preferably from a strip of spring steel or cold rolled steel having spring like characteristics which is readily worked by suitable bending and forming operations to the desired shape and size to be received in the said recess 12 in the knob or other object in a manner to provide a resilient bushing for receiving the flat shank or stem of the cooperating shaft, rod or spindle 30 in a completed installation, as presently to be described. A locking hole 31 is provided adjacent the end of the flat shank or stem, and if desired, two or more similar holes may be provided in axially spaced relation on the flat shank for any necessary or desirable disposition of the knob, or other operating member in connected relation on the shaft.

The spring clip 20, as best seen in Figs. 1, 2, 3 is formed from a simple strip of sheet metal to define a pair of spaced arms 21 adapted to embrace opposing faces of the flat shank 30 of the shaft or rod. The arms 21 of the clip when normally untensioned, are curved or flared generally outwardly from adjacent the bight of the U-shape of the clip and preferably terminate in outwardly projecting bent portions 22 defining abutments on the free ends of the arms 21 or body portions of the clip.

At suitably spaced points from the bight of the U-shaped clip, a pair of cooperating tongues 24 are stamped from the lower portions of the arms 21 of the clip to extend inwardly toward each other with the extremities of said tongues spaced from the bight of the U-shape a distance equal to or slightly greater than the distance from the end of the flat shank or stem 30 to the nearest edge of the hole 31 therein. The extremities of said lower tongues 24 otherwise are designed to snap into the hole 31 of the flat shank 30 with the end of said flat shank disposed adjacent the bight of the U-bend in the clip. The extremities of said tongues 24 thus define cooperating shoulder elements which are engageable with the wall of the hole 31 in the flat shank to lock the clip in positive connection therewith.

A similar pair of upper tongues 26 are stamped from the upper portions of the arms 21 of the clip in spaced relation to said lower tongues. These upper tongues 26 preferably are narrower to allow for the provision of outwardly projecting anchoring elements 27 in the form of tabs or prongs stamped outwardly from the arms 21 of the clip on either side of said upper tongues 26.

The extremities of the lower tongues 24 and the upper tongues 26, accordingly, define between the arms 21 of the clip spaced cooperating shoulder elements which are spaced lengthwise of the clip in a manner whereby either pair of cooperating shoulder elements 24 or 26 are adapted to be received in the hole 31 in the flat shaft or stem 30 as necessary or desirable, depending on the disposition of said shaft in an installation. Thus, in an installation in which the shaft 30 extends through an opening 1 in a panel P substantially as shown in Fig. 4, the lower cooperating shoulder elements 24 would be received in the hole 31 in the shaft. In the event that a certain adjustment of the shaft 30 in an installation results in a shorter length of the shaft in projecting relation to the panel P, as shown in Fig. 8, or in case the hole 31' in the shaft has a greater spacing from the end of the shaft, then the upper cooperating shoulder elements 26 would be received in such hole in the flat shank or stem of the shaft.

From the foregoing, it will be understood that the members comprising the improved connecting means of the invention are readily assembled and mounted in an installation, such as shown in Figs. 4 and 5, simply by applying the spring clip 20 to the projecting free end of the shaft 30, substantially as illustrated in Fig. 4 with the spaced arms 21 of the clip embracing the shaft and the extremities of the lower cooperating tongues 24 received in the hole 31 in the end of the shaft. In this relation, the upper cooperating tongues 26 bear upon the shaft and are adapted to be compressed into resilient frictional gripping relation therewith to rigidify the clip in attached position on said shaft. The knob, handle or other object 10 is then connected to the shaft by insertion of the shank and attached clip into the recess 10 in said object and pushing the object axially relatively to the shaft to substantially the position shown in Fig. 5 in which the knob portions surrounding the recess 12 are in substantial engagement with the outwardly projecting abutments 22 on the extremities of the arms of the clip. In the initial step of assembly, the leading U-shaped portion of the clip is readily received in said recess 10, and as the clip advances therein, the side walls 13 of the recess bear upon the outwardly flared arms 21 of the clip to cause a gradual compression of said arms toward the flat faces of the shank or stem 30 of the shaft. In this position, the outwardly projecting prongs, tabs or other anchoring elements 27, Figs. 5 and 6, are adapted to dig into and become embedded in the side walls 13 of said recess to lock the clip in attached position in said recess against withdrawal. At the same time, the upper pair of cooperating tongues 26 are compressed into resilient bearing engagement with the opposing flat faces of the shank or shaft stem to rigidify the attachment of the clip to the shaft. The clip otherwise is locked to the shaft by the lower tongues 24, Figs. 5 and 7, which are received in the hole 31 with the extremities thereof in abutting engagement with the adjacent wall of said hole in a manner whereby the clip is positively locked to the shank against withdrawal in the direction of removal therefrom. Accordingly, the positive locked connection of the object 10 to the shaft is effected by means of the inwardly bent tongues 24 in abutting engagement with the wall of the hole 31, Figs. 5 and 6, and the anchored engagement of the outwardly projecting anchoring elements 27 embedded in the side walls 13 of the recess 12 in said object together with the bearing engagement of the tongues 26 on the flat faces of the shaft shank and the resilient frictional binding engagement of the arms 21 of the clip with said side walls 13 of the recess.

In the fully assembled position of the connection shown in Fig. 5, the initially flared arms 21 of the clip are compressed and thereby urge and maintain the upper bearing tongues 26 into gripping bearing engagement with the shaft in the manner of a resilient bearing or bushing which supports the shaft in such a way as to absorb substantially the entire thrust and strain taking place in turning movements of the knob or other object. In addition, such a resilient bearing or bushing connection is advantageous in that the clip may accommodate any of several sizes and shapes of shafts and otherwise compensate for irregularities and manufacturing variations in the shaft stem. Thus, there is seldom any necessity for special shaping operations of the usual number of shafts or shaft stems in a supply which are not of the exact dimensions necessary for a proper fit in the socket openings or recesses in the parts to be mounted on the shafts.

Usually the spring holding clip 20 is first applied to assembled relation on the shaft shank as shown in Fig. 4, and the knob or other part thereafter attached, as foresaid. In certain instances, it is a more expeditious procedure to apply the spring clip 20 into the recess in the knob or other part and then apply the shaft stem or shank between the arms of the clip to effect a connection substantially the same as that illustrated in Fig. 5.

The described bearing engagement of the upper tongues 26 with the opposing faces of the flat shank in fully attached position shown in Fig. 5, provides a bushing or bearing mounting for the shaft end and also a slight spacing of the intermediate portions of the clip arms 21 from the flat faces of the shaft which permits disconnection and disassociating the parts of the assembly whenever necessary or desirable. This is accomplished through the abutments defined by the outwardly projecting bent portions 22 on the free ends of the arms 21 of the clip. These projections 22 may be compressed by a suitable tool such as a pair of pliers to cause the bearing tongues 26 of the clip to yield against the flat faces of the shank 30 and otherwise compress the clip arms 21 as necessary to withdraw the anchoring elements 27 from embedded engagement with the side walls 13 of the recess 12 in the part secured to the shaft. The part may thereupon be withdrawn by axial pull on the object as necessary to remove the shaft 30 and the attached clip 20 from the recess 12 in said object. The connection may thereafter be reassembled and mounted in an installation in a repetition of the foregoing described procedure.

Figs. 8 and 9 show the same general type of installation as described with reference to Figs. 1 to 7 inclusive but in which, for example, the mounting or adjustment of the shaft in the installation results in a shorter length of the shaft end in projecting relation to the panel or instrument board P. A similar circumstance may result when the hole 31' in the shaft end has a greater spacing from the end of the shaft than in the installation shown in Figs. 4 and 5. In either instance, the clip may be applied substantially as shown in Fig. 8 with the upper cooperating shoulder elements defined by the extremities of the tongues 26 received in the hole 31', and with the lower tongues 24 disposed in resilient bearing engagement with the flat faces of the shaft to rigidly the attachment of the clip on the shaft thereby providing a resilient bushing or bearing connection, as aforesaid. The knob, handle or other object 10 is then applied to assembled relation with the clip and shaft to provide a connection in substantially the same manner and of the same character as that described with reference to Figs. 1 to 7.

It is to be noted that the connecting means of the instant invention, in either embodiment, involves a most simple and inexpensive construction, making for a highly practical form of connecting arrangement by which a knob or any other article of manufacture may be easily and quickly secured onto a shaft or the like under continuously effective spring tension against relative rotative as well as relative axial movement.

It will be further appreciated that the improved connection of the invention is such as to be especially suited for use with articles formed of plastic compositions and other fragile materials inasmuch as the spring holding clip is so designed as to take practically the entire thrust and strain set up by the shaft thereby practically eliminating any tendency of splitting or breaking of the plastic knob, handle or other part when employed either for turning operations as in a rotary panel knob, or as a push-pull or lever operating device.

Though the description and drawings refer to the invention as incorporated in a panel knob or handle, for example, it will be understood that the instant connecting means is equally applicable wherever any article of manufacture is to be secured to a shaft, rod, spindle, etc., or in any installation in which an operating member is to be mounted by sliding over the end of a shaft or applied to a shaft stem to effect axial movements thereto or for the purpose of transmitting or receiving a relatively small torque.

And while the invention has been described in detail with specific examples, such examples are intended as illustrations only, since it will be apparent to those skilled in the art that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A joint or connection comprising connected members, one of said members comprising a stud or shank provided with a hole and the other member including a recess receiving said stud, and a fastener securing said stud in said recess comprising a piece of sheet metal bent to define a pair of spaced body portions receiving said stud, a tongue extending inwardly from one of said body portions received in said hole in the stud, another tongue extending inwardly from one of said body portions having resilient bearing engagement with the surface of said stud, and means projecting outwardly from a body portion anchoring the clip in said recess.

2. A joint or connection comprising connected members, one of said members comprising a stud or shank provided with a hole and the other member including a recess receiving said stud, and a fastener securing said stud in said recess comprising a piece of sheet metal bent to define a pair of spaced body portions receiving said stud, a pair of cooperating tongues extending inwardly from said body portions at opposite sides of said stud and received in said hole in the stud, another tongue extending inwardly from one of said body portions having resilient bearing engagement with the surface of said stud, and means projecting outwardly from a body portion anchoring the clip in said recess.

3. A joint or connection comprising connected members, one of said members comprising a stud or shank provided with a hole and the other member including a recess receiving said stud, and a fastener securing said stud in said recess comprising a piece of sheet metal bent to define a pair of spaced body portions receiving said stud, a pair of cooperating tongues extending inwardly from said body portions at opposite sides of said stud and received in said hole in the stud, another pair of tongues extending inwardly from said body portions having resilient bearing engagement with the surface of said stud, and means projecting outwardly from a body portion anchoring the clip in said recess.

4. A joint or connection comprising connected members, one of said members comprising a flat stud or shank provided with a transverse hole and the other member including a recess receiving said stud, and a fastener securing said stud in said recess comprising a generally U-shaped piece of sheet metal defining a pair of arms receiving said stud, a pair of cooperating tongues extending inwardly from said arms at opposite faces of said stud and received in said transverse hole in the stud, another pair of tongues extending inwardly from said body portions having resilient bearing engagement with the flat faces of said stud, outward projections on said arms anchoring the clip in said recess, and abutments on the extremities of said arms adapted to be compressed for releasing said outward projections from anchored relation in said recess to permit separation of said connected members.

5. A fastener for securing a stud in a recess in a member, said stud having a transverse hole, said fastener comprising a sheet metal body defining a pair of spaced arms receivable in said recess in said member and adapted to receive said stud therebetween, said arms having at least two projections spaced longitudinally of the fastener and projecting inwardly into the space between said arms, either of said projections being receivable in said transverse hole in the stud to secure the fastener thereto such that the fastener is adapted to be secured to the stud in different locations lengthwise of said stud for adjustment purposes, means on at least one of said arms spaced from the end thereof for anchoring said arms in compressed relation in said recess in said member, and outwardly projecting abutments on the ends of said arms.

6. A fastener for securing a stud in a recess in a member, said stud having a transverse hole, said fastener comprising a sheet metal body defining a pair of spaced arms receivable in said recess in said member and adapted to receive said stud therebetween, said arms having two pairs of opposite projections spaced longitudinally of the fastener and projecting inwardly into the space between said arms, either of said pairs of opposite projections being receivable in said transverse hole in the stud to secure the fastener thereto such that the fastener is adapted to be secured to the stud in different locations lengthwise of said stud for adjustment purposes, means projecting outwardly from said arms at points spaced from the ends thereof for anchoring said arms in compressed relation in said recess in said member, and outwardly projecting abutments on the ends of said arms.

7. A fastener for securing a stud in a recess in a member, said stud having a transverse hole, said fastener comprising a sheet metal body defining a pair of spaced arms receivable in said recess in said member and adapted to receive said stud therebetween, said arms having two pairs of opposite tongues spaced longitudinally of the fastener and projecting inwardly into the space between said arms, either of said pairs of opposite tongues being receivable in said transverse hole in the stud to secure the fastener thereto with the other pair of opposite tongues in resilient bearing engagement with the surface of said stud, whereby the fastener is adapted to be secured to the stud in different locations lengthwise of said stud for adjustment purposes, anchoring tongues projecting outwardly from said arms at points spaced from the ends thereof for anchoring said arms in compressed relation in said recess in said member, and outwardly projecting abutments on the ends of said arms.

CHARLES H. JUDD.

REFERENCES CITED

The following references are of record in the file of this patent:

UNITED STATES PATENTS

| Number | Name | Date |
| --- | --- | --- |
| 942,693 | Wintermute | Dec. 7, 1909 |
| 1,131,863 | Phillips | Mar. 16, 1915 |
| 1,676,014 | Fecher | July 3, 1928 |
| 2,293,615 | Murphy | Aug. 18, 1942 |
| 2,295,444 | Woodward | Sept. 8, 1942 |
| 2,313,858 | Armstrong | Mar. 16, 1943 |
| 2,528,675 | Tinnerman | Nov. 7, 1950 |